(12) United States Patent
Li et al.

(10) Patent No.: US 11,831,660 B2
(45) Date of Patent: Nov. 28, 2023

(54) BLOCKCHAIN-BASED METHOD AND SYSTEM FOR HANDLING DOMAIN NAME ABUSE

(71) Applicant: CHINA INTERNET NETWORK INFORMATION CENTER, Beijing (CN)

(72) Inventors: Hongtao Li, Beijing (CN); Yu Zeng, Beijing (CN); Guanggang Geng, Beijing (CN); Zhiwei Yan, Beijing (CN); Kejun Dong, Beijing (CN); Yong Chen, Beijing (CN)

(73) Assignee: CHINA INTERNET NETWORK INFORMATION CENTER, Beijing (CN)

( * ) Notice: Subject to any disclaimer, the term of this patent is extended or adjusted under 35 U.S.C. 154(b) by 526 days.

(21) Appl. No.: 17/252,669

(22) PCT Filed: Feb. 18, 2019

(86) PCT No.: PCT/CN2019/075399
§ 371 (c)(1),
(2) Date: Dec. 15, 2020

(87) PCT Pub. No.: WO2020/155205
PCT Pub. Date: Aug. 6, 2020

(65) Prior Publication Data
US 2021/0266337 A1    Aug. 26, 2021

(30) Foreign Application Priority Data
Jan. 31, 2019   (CN) .......................... 201910099025.4

(51) Int. Cl.
*G06F 21/64*    (2013.01)
*G06F 21/62*    (2013.01)
(Continued)

(52) U.S. Cl.
CPC ........ *H04L 63/1416* (2013.01); *H04L 9/3239* (2013.01); *H04L 61/4511* (2022.05)

(58) Field of Classification Search
None
See application file for complete search history.

(56) References Cited

U.S. PATENT DOCUMENTS

| | | | | |
|---|---|---|---|---|
| 8,869,269 | B1 * | 10/2014 | Ramzan | H04L 61/30 709/206 |
| 2018/0278427 | A1 | 9/2018 | Thakore et al. | |
| 2019/0166085 | A1 * | 5/2019 | Li | H04L 9/0618 |

FOREIGN PATENT DOCUMENTS

| | | |
|---|---|---|
| CN | 107613041 A | 1/2018 |
| CN | 107770198 A | 3/2018 |

(Continued)

OTHER PUBLICATIONS

International Search Report dated Oct. 24, 2019 of PCT Application No. PCT/CN2019/075399 in 5 pages.

*Primary Examiner* — Venkat Perungavoor
(74) *Attorney, Agent, or Firm* — Knobbe, Martens, Olson & Bear, LLP (57) ABSTRACT

Provided in the embodiments of the present disclosure are a blockchain-based method and system for handling domain name abuse. All network nodes in a public blockchain can report domain name abuse, and all network nodes receiving reported data are entitled to participate in the process of judging whether domain name abuse exists in the reported data. The public blockchain obtains a target judgment result of whether domain name abuse exists by means of integrating first judgment results of multiple identification nodes on whether domain name abuse exists in the reported data and credit value of each identification node. Alternatively, when the number of identification nodes in the public blockchain is less than a preset number of nodes, a consortium block- (Continued)

chain composed of regulatory agencies directly judges whether domain name abuse exists in the reported data, and the judgment result serves as the target judgment result. Since the target judgment result is obtained through joint determination of nodes in the public blockchain or the consortium blockchain, the judgment result is not interfered by personal factors, with high accuracy and credibility, and thus the reported data is timely processed.

10 Claims, 3 Drawing Sheets

(51) Int. Cl.
*H04L 9/40* (2022.01)
*H04L 9/32* (2006.01)
*H04L 61/4511* (2022.01)
*G06F 21/71* (2013.01)

(56) References Cited

FOREIGN PATENT DOCUMENTS

| CN | 10806444 A | 5/2018 |
| CN | 108681966 A | 10/2018 |
| CN | 108810901 A | 11/2018 |

\* cited by examiner

BLOCKCHAIN-BASED METHOD AND SYSTEM FOR HANDLING DOMAIN NAME ABUSE

CROSS-REFERENCE TO RELATED APPLICATION

The present application is the U.S. National Phase Application under 35 U.S.C. § 371 of International Application No. PCT/CN2019/075399, filed Feb. 18, 2019, designating the U.S. and published as WO 2020/155205 A1 on Aug. 6, 2020, which claims priority to Chinese Application No. 2019100990254 filed on Jan. 31, 2019, entitled "Blockchain-Based Method and System for Handling Domain Name Abuse," which is incorporated herein by reference in its entirety.

FIELD OF TECHNOLOGY

The embodiments of the present disclosure relate to the technical field of domain name maintenance, and more particularly, to a blockchain-based method and system for handling domain name abuse.

BACKGROUND

Domain name abuse refers to the use of domain names as portals to carry out illegal and criminal activities, such as phishing, illegal content, malware and viruses etc. Domain name abuse is a global phenomenon, and it has the following problems in the current domain name regulation. (1) There is no unified regulatory agency: the regulators of domain name abuse may be domain name management agencies, domain name registrars, and government departments. There are several government departments, domain name management agencies and Internet public welfare organizations that regulate domain name abuse at home. (2) Regulatory standards are dis-unified: it is difficult to quantify the criteria for judging domain name abuse, and there are some subjective factors. Different countries have different laws and regulations, and there are multiple regulatory agencies in the same region wherein the regulatory standards of different agencies may also be different. (3) Regulatory data is not shared: there are two sources of domain name abuse data, that is, reporting by users to a certain regulatory agency and actively reviewing by a regulatory agency. There is no data sharing mechanism among different regulatory agencies, and the regulatory data and results are not transparent to the public. (4) There is room for interest rent seeking: due to the non-publicity of data, there is room for interest rent seeking in the regulation of domain name abuse. Due to the fragmented domain name abuse regulatory systems across regulatory agencies, these problems exist for a long time and cannot be resolved.

In the process of implementing the embodiments of the present disclosure, inventors found that the traditional domain name regulation is susceptible to the interference of individual subjective factors, and the judgment results for domain name abuse are inaccurate and domain name abuse is not judged timely.

SUMMARY

The technical problems to be solved by the present disclosure include: the traditional domain name regulation is susceptible to the interference of individual subjective factors, the judgment results for domain name abuse are inaccurate and domain name abuse is not judged timely.

In order to solve the technical problems above, the embodiments of the present disclosure provide a blockchain-based method for handling domain name abuse, including:

obtaining the number of identification nodes in a public blockchain that participate in judging whether domain name abuse exists in reported data within a set time limit after any first network node in the public blockchain receives the reported data of domain name abuse;

if the number of identification nodes is greater than or equal to a preset number of nodes, calculating a result of whether domain name abuse exists in the reported data according to a first judgment result of each identification node on whether domain name abuse exists in the reported data and a credit value of each identification node, as a target judgment result;

if the number of identification nodes is less than the preset number of nodes, sending the reported data to a consortium blockchain, and taking a received second judgment result of the consortium blockchain on whether domain name abuse exists in the reported data as a target judgment result;

wherein, the consortium blockchain is the blockchain formed by a second network node where the regulatory agency of the domain name is located.

The present embodiment provides a blockchain-based system for handling domain name abuse, including a public blockchain, and a consortium blockchain formed by a second network node where regulatory agency of the domain name is located;

the number of identification nodes in the public blockchain that participate in judging whether domain name abuse exists in reported data within a set time limit is obtained after any first network node in the public blockchain receives the reported data of domain name abuse;

if the number of identification nodes is greater than or equal to the preset number of nodes, a result of whether domain name abuse exists in the reported data is calculated according to a first judgment result of each identification node on whether domain name abuse exists in the reported data and a credit value of each identification node, as a target judgment result; and if the number of identification nodes is less than the preset number of nodes, the reported data is sent to a consortium blockchain, and a received second judgment result of the consortium blockchain on whether domain name abuse exists in the reported data is taken as a target judgment result.

Provided in the embodiments of the present disclosure are a blockchain-based method and system for handling domain name abuse. All network nodes in a public blockchain can report domain name abuse, and all network nodes receiving reported data are entitled to participate in the process of judging whether domain name abuse exists in the reported data. The public blockchain obtains a target judgment result of whether domain name abuse exists by means of integrating first judgment results of multiple identification nodes on whether domain name abuse exists in the reported data and credit value of each identification node. Alternatively, when the number of identification nodes in the public blockchain is less than a preset number of nodes, a consortium blockchain composed of regulatory agencies directly judges whether domain name abuse exists in the reported data, and uses the judgment result as the target judgment result. Since the target judgment result is obtained through joint determination of nodes in the public blockchain or the consortium blockchain, the judgment result is not interfered by personal factors and has high accuracy and credibility, thereby enabling timely processing of the reported data.

BRIEF DESCRIPTION OF THE DRAWINGS

In order to illustrate the embodiments of the present disclosure or the technical solutions in the prior art, drawings needed in the embodiments or the description of the prior art will be briefly introduced as follows. Obviously, the drawings in the following description are only some of the embodiments of the present disclosure. For those of ordinary skill in the art, other drawings can be obtained based on these drawings without paying any creative effort.

DETAILED DESCRIPTION

In order to make the objectives, technical solutions and advantages of the embodiments of the present disclosure clearer, the technical solutions in the embodiments of the present disclosure will be described clearly and completely in conjunction with the accompanying drawings in the embodiments of the present disclosure. Obviously, the embodiments described are part of the embodiments of the present disclosure, rather than all of the embodiments. Based on the embodiments in the present disclosure, all other embodiments obtained by those of ordinary skill in the art without creative effort shall fall within the protection scope of the present disclosure.

Before introducing the method according to the present embodiment, the blockchain is introduced as follows: blockchain is a new application mode of computer technology such as distributed data storage, peer-to-peer network, consensus mechanism, encryption algorithm, and the like. Blockchain mainly addresses the issues of trust and security of transactions, so it proposes four technical innovations in response to related problems: the first is called a distributed ledger, that is, transaction bookkeeping is completed by multiple nodes distributed in different places, and each node records a complete ledger, so all of them can participate in regulating the legality of transactions, as well as jointly testify for them. Unlike traditional distributed storage, the uniqueness of distributed storage of blockchain is mainly manifested in two ways: first, each node of the blockchain stores complete data according to a blockchain structure, while in traditional distributed storage, data is usually stored in multiple copies according to certain rules; second, the storage of each node of the blockchain is independent and equal in status, relying on consensus mechanism to ensure the consistency of storage, while in traditional distributed storage, data is generally synchronized through a central node to other backup nodes. Each node competes to obtain new blocks, and the new blocks need to be confirmed by a certain number of other nodes before they can be finally chained, and thus the possibility of a single bookkeeper being controlled or bribed to keep false accounts is avoided. The blockchain system has a certain tolerance threshold for malicious nodes, and all nodes in the chain can still reach consensus through the consensus mechanism as long as the proportion of malicious nodes is within the threshold. Therefore, theoretically, the more nodes participating in the chain, the higher the security of the system.

The second is called an asymmetric encryption and authorization technology. The transaction information stored in the blockchain is public, but the account identity information is highly encrypted and can only be accessed with the authorization of the data owner, thus ensuring data security and personal privacy.

The third is called a consensus mechanism, which is about how to reach a consensus among all the bookkeeping nodes to identify the validity of a record, which is both a means of identification and a means of preventing tampering. Currently, depending on different application scenarios and based on the design goals of high efficiency, high security, and high availability, various innovative consensus mechanisms have brought vitality to blockchain technology.

The consensus mechanism of the blockchain is characterized by "the minority is subordinate to the majority" and "everyone is equal," wherein "the minority is subordinate to the majority" does not exclusively refer to the number of nodes, but also to computing power, number of shares, or other computer-comparable characteristic quantity. "Everyone is equal" means that when nodes satisfy the condition, all these nodes are entitled to preferentially present a consensus result, which may ultimately become the final consensus result after being directly agreed upon by other nodes. Blockchain is divided into a public blockchain, a private blockchain and a consortium blockchain according to different application scenarios. The public blockchain is a blockchain that is open to the entire network and has no user authorization mechanism. The private blockchain is a blockchain in which all the nodes in the network are controlled by one agency. The consortium blockchain, also known as industry blockchain, is a blockchain in which authorized nodes are allowed to join the network and view information based on permissions, and it is often used between agencies.

The blockchain-based method for handling domain name abuse according to the present embodiments uses the consortium blockchain and public blockchain as data storage and transmission carriers in the domain name abuse regulation process, and uses the characteristic of decentralization of blockchain to regulate the public's reporting and identification of domain name abuse through smart contracts, to achieve unified standards for reporting and identification in the domain name abuse regulation process, and to realize secure and reliable opening and sharing of regulatory data and review results.

Figure 1:
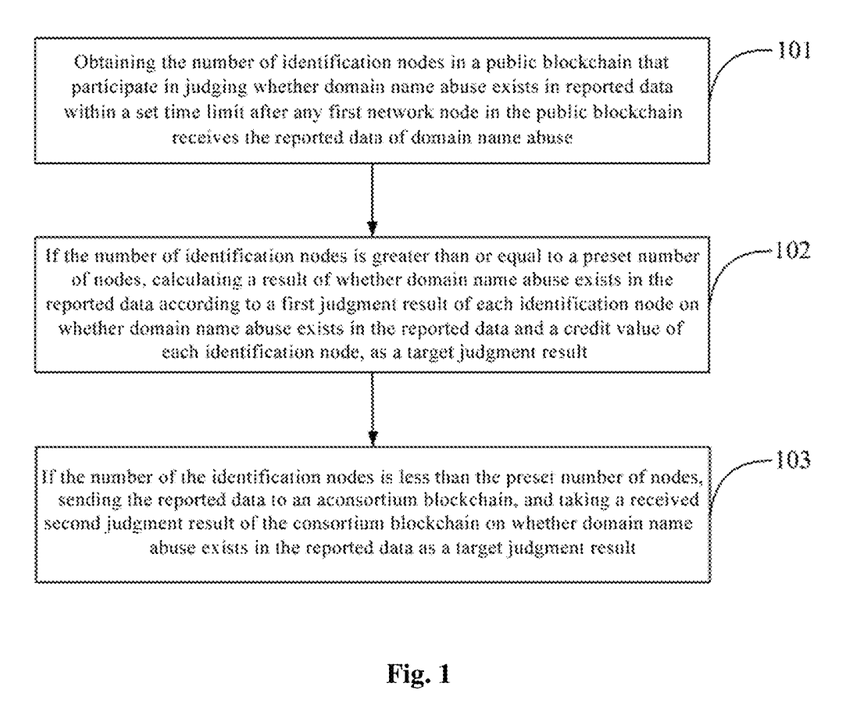
FIG. 1 is a schematic flowchart of a blockchain-based method for handling domain name abuse according to an embodiment of the present disclosure.

FIG. 1 is a schematic flowchart of a blockchain-based method for handling domain name abuse according to the present embodiment. As shown in FIG. 1, the method includes:

101: obtaining the number of identification nodes in a public blockchain that participate in judging whether domain name abuse exists in reported data within a set time limit after any first network node in the public blockchain receives the reported data of domain name abuse;

102: if the number of identification nodes is greater than or equal to the preset number of nodes, calculating a result of whether domain name abuse exists in the reported data according to a first judgment result of each identification node on whether domain name abuse exists in the reported data and a credit value of each identification node, as a target judgment result; and 103: if the number of identification nodes is less than the preset number of nodes, sending the reported data to a consortium blockchain, and taking a received second judgment result of the consortium blockchain on whether domain name abuse exists in the reported data as a target judgment result;

wherein the consortium blockchain is a blockchain formed by a second network node where the regulatory agency of the domain name is located.

The public blockchain is a blockchain composed of user-oriented network nodes. Each network node of the public blockchain may report domain name abuse and is entitled to participate in the process of judging whether domain name abuse exists in the reported data. After the reported data is received, if the number of identification nodes participating in judging whether domain name abuse exists in the reported data is less than the preset number of nodes within the set time limit, the judgment result of the public blockchain is considered untrustworthy, then the reported data needs to be sent to the consortium blockchain which will judge whether domain name abuse exists in the reported data. In the judgement of the public blockchain on whether domain name abuse exists in the reported data, the judgment results of multiple network nodes are combined to determine a final target judgment result, and thus the target judgment result avoids the interference of accidental factors in the judgment by a single node, and has high accuracy and reliability. The public blockchain can process the received reported data in a timely manner, so that domain name abuse may be rapidly judged.

The set time limit is a preset time period, for example, the set time limit is 2 s. The preset number of nodes is a preset value, for example, the preset number of nodes is q, and more concretely, q=10, which is not specifically defined by the present embodiment. In the consortium blockchain, each second network node of the consortium blockchain judges and handles according to its own scope of regulatory business. The judgment made by any node in the consortium blockchain that domain name abuse exists in the reported data is the final judgment result of the consortium blockchain, only if all nodes in the consortium blockchain identify that domain name abuse does not exist in the reported data, can it finally be identified that domain name abuse does not exist in the reported data.

For example, the set time limit o is 24 hours by default.

Provided in the present embodiments is a blockchain-based method for handling domain name abuse. All network nodes in a public blockchain can report domain name abuse, and all network nodes receiving reported data are entitled to participate in the process of judging whether domain name abuse exists in the reported data. The public blockchain obtains a target judgment result of whether domain name abuse exists in the reported data by means of integrating first judgment results of multiple identification nodes on whether domain name abuse exists in the reported data and credit value of each identification node. Alternatively, when the number of identification nodes in the public blockchain is less than a preset node number, a consortium blockchain composed of regulatory agencies directly judges whether domain name abuse exists in the reported data, and the judgment result serves as the target judgment result. Since the target judgment result is obtained through joint judgment of nodes in the public blockchain or the consortium blockchain, the judgment result is not interfered by personal factors and has high accuracy and credibility, and thus the reported data is timely processed.

In an embodiment, on the basis of the foregoing embodiment, the method further includes:

if the first network node is one of the identification nodes, judging whether the first judgment result corresponding to the first network node is consistent with the target judgment result;

if the first judgment result corresponding to the first network node is consistent with the target judgment result, broadcasting to each network node of the blockchain to add a first preset number of credit values for the first network node, so as to add the first preset number of credit values for the first network node in each network node of the blockchain.

In an embodiment, on the basis of the foregoing embodiments, the method further includes:

if the first judgment result corresponding to the first network node is not consistent with the target judgment result, broadcasting to each network node of the public blockchain to deduct a second preset number of credit values for the first network node, so as to deduct the second preset number of credit values for the second network node in each network node of the of the public blockchain.

In order to encourage nodes to report domain name abuse and participate in the process of judging domain name abuse, each network node of the public blockchain is set to have three characteristics: credit value A, participation value B and accumulate points C. The public's reporting and identification of domain name abuse are regulated through the implementation of smart contracts.

For identification nodes in the public blockchain, if the judgment result of the identification node is consistent with the final target judgment result, the credit value of the identification node will be increased and otherwise, it will be reduced.

There are two implementations in the present embodiment. (1) Whether the number of identification nodes is greater than or equal to the preset number of nodes, or is less than the preset number of nodes, the nodes whose judgment results are consistent with the target judgment results will be added by the first preset number of credit values, and those that are inconsistent will be deducted by the second preset number of credit values. (2) When the number of identification nodes is greater than or equal to the preset number of nodes, the nodes whose judgment results are consistent with the target judgment results will be added by the first preset number of credit values, and those that are inconsistent will be deducted by the second preset number of credit values; when the number of identification nodes is less than the preset number of nodes, the nodes whose judgment results are consistent with the target judgment results will be added by a seventh preset number of credit values, and those that are inconsistent will be deducted by a eighth preset number of credit values.

For example, for nodes that participate in the identification, those whose judgment results are consistent with the final judgment result by the public will obtain r credits; those whose judgment results are inconsistent with the final judgment result by the public will be deducted by s credits. After being secondly identified by the regulatory agencies in the consortium blockchain, the credit value of the original reporting node in the public blockchain will be added by u. The value of u can be dynamically adjusted according to actual business conditions, and is 1 by default.

Wherein, the first preset number is r, and the second preset number is s; r is 0.1 by default, and s is a value from 0 to 1.

According to the blockchain-based method for handling domain name abuse in the present embodiment, the credit value of the network node can be adjusted based on whether the judgment result is consistent with the final target judgment result, so that the network node providing an accurate judgment has a higher credit value, thereby increasing the accuracy of the judgment result.

In an embodiment, on the basis of the foregoing embodiments, the method further includes:

for a third network node in the public blockchain that reports domain name abuse, if the target judgment result is that domain name abuse exists in the reported data, broadcasting to each network node of the public blockchain to add a third preset number of credit values for the third network node, so as to add the third preset number of credit values for the third network node in each network node of the public blockchain.

In an embodiment, on the basis of the foregoing embodiments, the method further includes:

if the target judgment result is that domain name abuse does not exist in the reported data, broadcasting to each network node of the public blockchain to deduct a fourth preset number of credit values for the third network node, so as to deduct the fourth preset number of credit values for the third network node in each network node of the of the public blockchain.

The third preset number is y, and the fourth preset number is z; y is 1 by default, and z is a value from 0 to 1. In order to encourage accurate reporting of domain name abuse, the reporting node whose target judgment result is that domain name abuse exists will be added by the third preset number of credit values; and the reporting node whose target judgment result is that domain name abuse does not exist will be deducted by the fourth preset number of credit values.

In an embodiment, on the basis of the foregoing embodiments, said if the number of identification nodes is greater than or equal to the preset number of nodes, calculating a result on whether domain name abuse exists in the reported data according to a first judgment result of each identification node on whether domain name abuse exists in the reported data and a credit value of each identification node, as the target judgment result includes:

if the number of identification nodes is greater than or equal to the preset number of nodes, obtaining the first judgment result of each identification node on whether domain name abuse exists in the reported data, and numerating the first judgment result; calculating a numerical result for indicating whether domain name abuse exists in the reported data from an equation $$M = \frac{\sum_{k=1}^{n}\left(m^{k} * \sqrt{A * k}\right)}{\sum_{k=1}^{n}\sqrt{A * k}}$$

based on the numerated first judgment result and the credit value of each identification node, and obtaining the target judgment result that whether domain name abuse exists in the reported data according to a numerical range to which the numerical result belongs;

wherein, M is a numerical result indicating whether domain name abuse exists in the reported data, n is the total number of identification nodes in the public blockchain, k represents the k-th identification node, m is a numerical value of the first judgment result of the k-th identification node, and A is a credit value of the k-th identification node; if M>1, the target judgment result is that domain name abuse exists in the reported data, and if M<1, the target judgment result is that domain name abuse does not exist in the reported data; if the first judgment result of an identification node is that domain name abuse exists in the reported data, m=1, otherwise, m=0.

M greater than 1 means that the public confirms the domain name abuse. When n is greater than or equal to q, the above equation is used to calculate a numerical result indicating whether domain name abuse exists in the reported data. Wherein, q is the preset number of nodes.

According to the blockchain-based method for handling domain name abuse provided in the present embodiment, the final target judgment result is determined by means of combining the judgment results and credit values of the identification nodes through the preset calculation equation, thereby improving the accuracy of the target judgment result.

Figure 2:
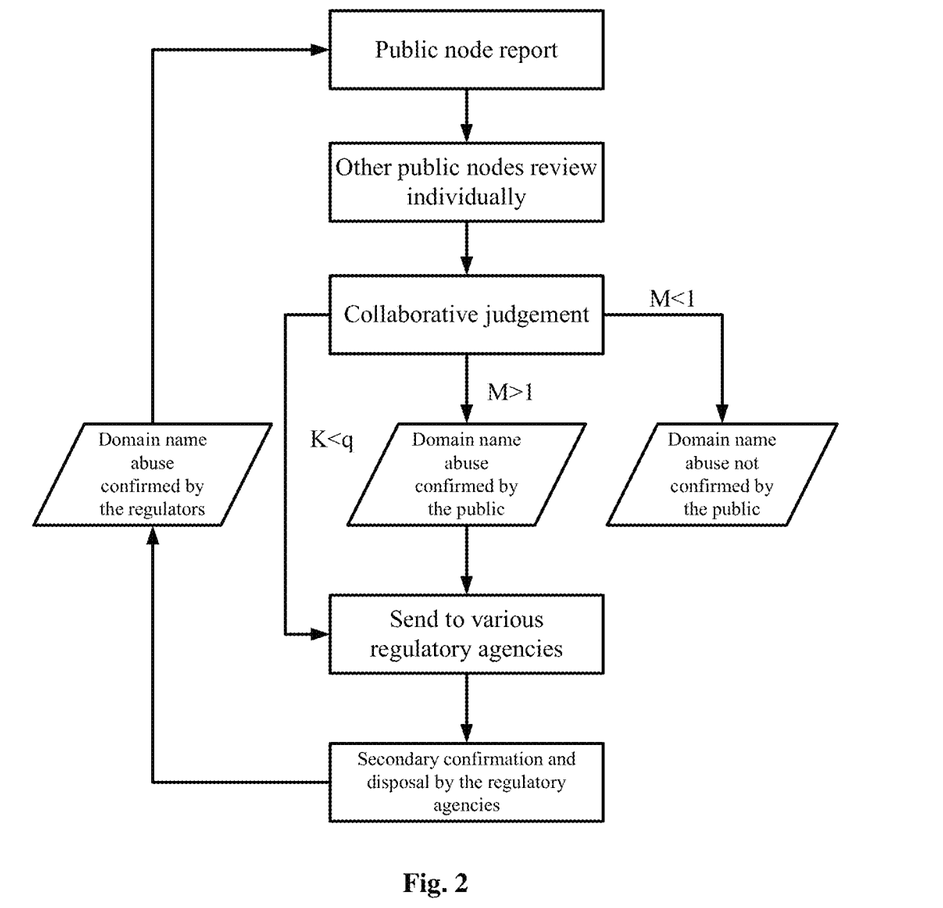
FIG. 2 is a business flowchart of a domain name abuse regulation according to another embodiment of the present disclosure.

Specifically, FIG. 2 is a business flowchart of a domain name abuse regulation according to the present embodiment. As shown in FIG. 2, the reported data is reviewed in the public blockchain, and the value of M is judged through the judgment method specified in the contract to determine whether domain name abuse exists. When the public identifies that domain name abuse exists, a second identification is then made by the regulatory agency to ensure the correctness of the judgment result of domain name abuse.

In an embodiment, on the basis of the foregoing embodiments, the method further includes:

after the first network node as an identification node participates in judging whether domain name abuse exists in the reported data each time, broadcasting to each network node of the public blockchain to add a fifth preset number of participation values and point increment for the first network node, so as to add the fifth preset number of participation values and point increment for the first network node in each network node of the public blockchain.

In an embodiment, on the basis of the foregoing embodiments, the method further includes:

after the first network node reports domain name abuse each time, broadcasting to each network node of the public blockchain to add a sixth preset number of participation values and point increment for the first network node, so as to add the sixth preset number of participation values and point increment for the first network node in each network node of the public blockchain.

In an embodiment, on the basis of the foregoing embodiments, the method further includes:

in the public blockchain, nodes with higher participation values have more permissions, and points of the network nodes can be redeemed for the set reward products.

The participation value is x, and x is 1 by default. The fifth preset number is p, and the default value of p is 0.1. The initial value of the points is set to 0.

Specifically, (1) a node in the public blockchain can submit a domain name abuse report, and will get x participation values and x points for each reporting; a reporting node whose domain name abuse report is finally identified will get a credit value of y for each report, and a reporting node whose domain name abuse report fails to pass the public's review will be deducted by a dynamic credit value of z. (2) Other nodes in the public blockchain can review the reported data within the set time limit o, and judge whether domain name abuse exists in the reported data, the judgment being numerated as m (yes as 1, no as 0), and p participation values can be obtained for each review. A final identification result M is calculated by taking weighted average of the credit value of each node participating in the identification. If M is greater than 1, it means that the public identifies the domain name abuse. When the set time limit o is exceeded and the number of public reviewers k is still less than q, the reported data directly enters the consortium blockchain for being identified. (3) The domain name abuse data identified by the public enters the consortium blockchain composed of regulatory agencies, and the regulatory agencies will conduct secondary identification and final disposal in accordance with their review scope and in the light of internal business logic. (4) The points of nodes in the public blockchain can be redeemed for rewards, the redemption rules are formulated by the regulatory agencies according to the actual situation, and the redemption situation is written into the public blockchain and open to the public.

For example, a public node discovers a domain name abuse in daily online behavior and submits an abuse report, other public nodes can participate in the identification of domain name abuse. Each node obtains credit value, participation value and points according to the contribution in the reporting and identification work, and the points can be used to redeem rewards. The identification result of domain name abuse by the public will be reported to various regulatory agencies through the consortium blockchain. Alternatively, the regulatory agencies obtain the domain name abuse data after public identification from the consortium blockchain, and conduct secondary identification and disposal of the abuse data based on its own business scope. The results of identification and disposal will be disclosed to the public through the public blockchain.

On the other hand, the present embodiment provides a blockchain-based system for handling domain name abuse, including a public blockchain, and a consortium blockchain formed by a second network node where the regulatory agency of the domain name is located;

the number of identification nodes in the public blockchain that participate in judging whether domain name abuse exists in reported data within a set time limit is obtained after any first network node in the public blockchain receives the reported data of domain name abuse;

if the number of identification nodes is greater than or equal to the preset number of nodes, a result that whether domain name abuse exists in the reported data is calculated according to a first judgment result of each identification node on whether domain name abuse exists in the reported data and a credit value of each identification node, as a target judgment result;

if the number of identification nodes is less than the preset number of nodes, the reported data is sent to the consortium blockchain, and a received second judgment result of the consortium blockchain on whether domain name abuse exists in the reported data is taken as a target judgment result.

Figure 3:
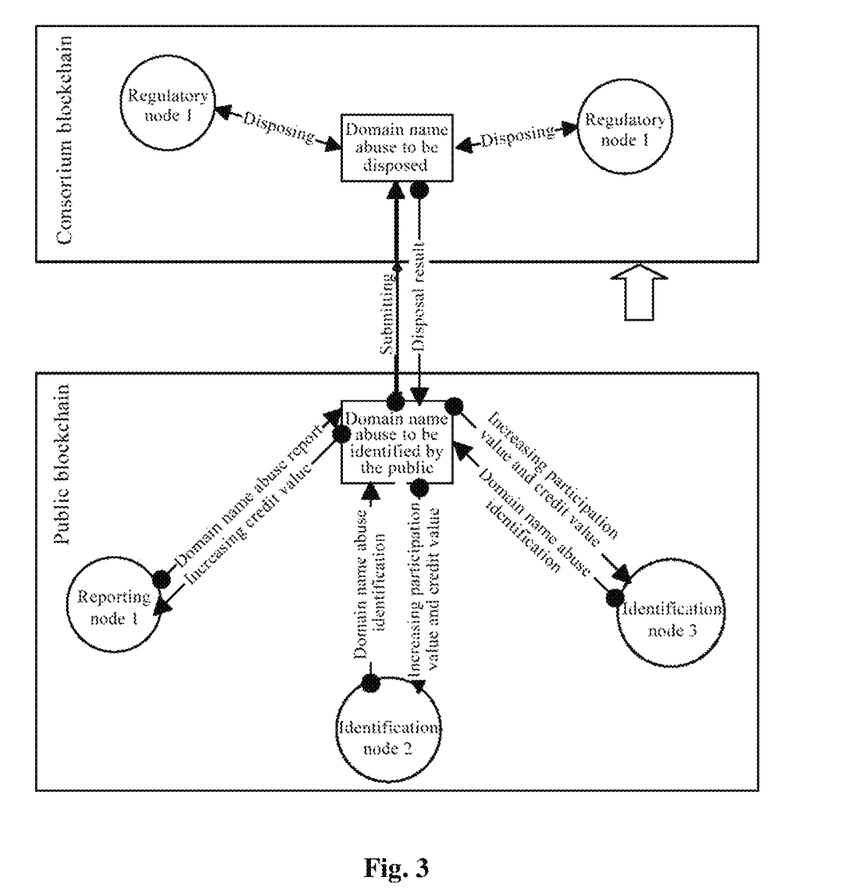
FIG. 3 is a schematic diagram of data interaction between a consortium blockchain and a public blockchain in a business process according to another embodiment of the present disclosure.

FIG. 3 is a schematic diagram of data interaction between a consortium blockchain and a public blockchain in a business process according to the present embodiment. As shown in FIG. 3, in the public blockchain, after the reporting node reports a domain name abuse, if only the public identifies domain abuse, the credit value of the reporting node will be increased. If the judgment results of the identification nodes participating in the identification are consistent with the public identification result, the credit values of the identification nodes will also be increased. When there are fewer identification nodes participating in the identification, the identification is made by the consortium blockchain. The consortium blockchain sends the results by the regulatory nodes to the public blockchain.

The system, supported by the underlying technology of the blockchain, regulates and encourages the public to report and identify domain name abuse in a crowdsourcing manner by means of smart contracts, thereby achieving a fair and impartial blacklisting common review mechanism; meanwhile, it avoids individual subjective factors in the process of domain name regulation and unifies the public standards of domain name abuse regulation; in addition, the system also enables fast, secure and reliable sharing of domain name abuse data among various regulatory agencies.

Provided in the present embodiments is a blockchain-based system for handling domain name abuse. All network nodes in a public blockchain can report domain name abuse, and all network nodes receiving reported data are entitled to participate in the process of judging whether domain name abuse exists in the reported data. The public blockchain obtains a target judgment result of whether domain name abuse exists in the reported data by means of integrating first judgment results of multiple identification nodes on whether domain name abuse exists in the reported data and credit value of each identification node. Alternatively, when the number of identification nodes in the public blockchain is less than a preset node number, a consortium blockchain composed of regulatory agencies directly judges whether domain name abuse exists in the reported data, and the judgment result serves as the target judgment result. Since the target judgment result is obtained through joint determination of nodes in the public blockchain or the consortium blockchain, the judgment result is not interfered by personal factors and has high accuracy and credibility, thereby enabling timely processing of the reported data.

In summary, in the method and system according to the present embodiments, public reporting of domain name abuse is regulated based on the contract of the public blockchain, domain name abuse reporting standards are unified in the form of crowdsourcing and smart contracts, and individual subjective factors are avoided; moreover, the number of invalid reports is greatly decreased and thus the disposal efficiency of regulatory agencies is improved; the public is rewarded for reporting and collaborative review using smart contracts, which encourages active public participation; the respective business processes and business systems of various regulatory agencies have been fully considered, and the public blockchain and the consortium blockchain are only used as unified entry for data reporting and export of disposal results without involving the existing business systems of regulatory agencies; the domain name abuse data identified and disposed by each regulatory agency is recorded by using the double chains of consortium blockchain and public blockchain, and the data is uniformly opened and shared to each regulatory agency and the public so as to avoid being replaced and tampered with in the later stage.

Finally, it should be noted that the above embodiments are only for illustrating the technical solutions of the present disclosure, rather than limiting them; although the present disclosure has been described in detail with reference to the foregoing embodiments, those skilled in the art should understand that the technical solutions documented in the preceding embodiments may still be modified, or parts or all of the technical features thereof can be equivalently substituted; and such modifications or substitutions do not deviate from scope of the technical solutions of the embodiments of the present disclosure.

The invention claimed is:

1. A computer-implemented blockchain-based method for handling domain name abuse, comprising:
    obtaining a number of identification nodes in a public blockchain that participate in judging whether domain name abuse exists in reported data within a set time limit after any first network node in the public blockchain receives the reported data of domain name abuse;
in response to determining that the number of identification nodes is greater than or equal to a preset number of nodes, calculating a result of whether domain name abuse exists in the reported data according to a first judgment result of each identification node on whether domain name abuse exists in the reported data and a credit value of each identification node as a target judgment result; and
in response to determining that the number of the identification nodes is less than the preset number of nodes, sending the reported data to a consortium blockchain, and taking a received second judgment result of the consortium blockchain, on whether domain name abuse exists in the reported data as the target judgment result;
wherein, the consortium blockchain is a blockchain formed by a second network node where a regulatory agency of the domain name is located.

2. The method of claim 1, further comprising:
in response to determining that the first network node is one of the identification nodes:
judging whether the first judgment result corresponding to the first network node is consistent with the target judgment result; and
in response to determining that the first judgment result corresponding to the first network node is consistent with the target judgment result, broadcasting to each network node of the blockchain to add a first preset number of credit values for the first network node, so as to add the first preset number of credit values for the first network node in each network node of the blockchain.

3. The method of claim 2, further comprising:
in response to determining that the first judgment result corresponding to the first network node is not consistent with the target judgment result, broadcasting to each network node of the public blockchain to deduct a second preset number of credit values for the first network node, so as to deduct the second preset number of credit values for the second network node in each network node of the of the public blockchain.

4. The method of claim 1, further comprising:
for a third network node in the public blockchain that reports domain name abuse, in response to determining that the target judgment result indicates that a domain name abuse exists in the reported data, broadcasting to each network node of the public blockchain to add a third preset number of credit values for the third network node, so as to add the third preset number of credit values for the third network node in each network node of the of the public blockchain.

5. The method of claim 4, further comprising:
in response to determining that the target judgment result indicates that a domain name abuse does not exist in the reported data, broadcasting to each network node of the public blockchain to deduct a fourth preset number of credit values for the third network node, so as to deduct the fourth preset number of credit values for the third network node in each network node of the of the public blockchain.

6. The method of claim 1, wherein said in response to determining that the number of identification nodes is greater than or equal to the preset number of nodes, calculating a result of whether domain name abuse exists in the reported data according to a first judgment result of each identification node on whether domain name abuse exists in the reported data and a credit value of each identification node, as a target judgment result comprises:
in response to determining that the number of identification nodes is greater than or equal to the preset number of nodes, obtaining a first judgment result of each identification node on whether domain name abuse exists in the reported data, and numerating the first judgment result; calculating a numerical result for indicating whether domain name abuse exists in the reported data from an equation $$M = \frac{\sum_{k=1}^{n}\left(m^k * \sqrt{A*k}\right)}{\sum_{k=1}^{n} \sqrt{A*k}}$$

based on the numerated first judgment result and the credit value of each identification node, and obtaining the target judgment result of whether domain name abuse exists in the reported data according to a numerical range in which the numerical result is located;
wherein, M is a numerical result indicating whether domain name abuse exists in the reported data, n is a total number of identification nodes in the public blockchain, k represents the k-th identification node, m is a numerical value of the first judgment result of the k-th identification node, and A is a credit value of the k-th identification node; if M>1, the target judgment result indicates that a domain name abuse exists in the reported data, and if M<1, the target judgment result indicates that a domain name abuse does not exist in the reported data; in response to determining that the first judgment result of an identification node indicates that a domain name abuse exists in the reported data, m=1, otherwise, m=0.

7. The method of claim 1, further comprising:
after the first network node as an identification node participates in judging whether domain name abuse exists in the reported data each time, broadcasting to each network node of the public blockchain to add a fifth preset number of participation values and point increment for the first network node, so as to add the fifth preset number of participation values and point increment for the first network node in each network node of the public blockchain.

8. The method of claim 1, further comprising:
after the first network node reports domain name abuse each time, broadcasting to each network nodes of the public blockchain to add a sixth preset number of participation values and point increment for the first network node, so as to add the sixth preset number of participation values and point increment for the first network node in each network node of the public blockchain.

9. The method of claim 1, further comprising:
in the public blockchain, nodes with higher participation values having more permissions, and redeeming points of the network nodes for set reward products.

10. A computer-implemented blockchain-based system for handling domain name abuse, comprising:
a public blockchain, and
a consortium blockchain formed by a second network node where a regulatory agency of the domain name is located;

wherein:
  a number of identification nodes in the public blockchain that participate in judging whether domain name abuse exists in reported data within a set time limit is obtained after any first network node in the public blockchain receives the reported data of domain name abuse;
  wherein the blockchain-based system is configured to:
    in response to determining that the number of identification nodes is greater than or equal to a preset number of nodes, calculate a result of whether domain name abuse exists in the reported data according to a first judgment result of each identification node on whether domain name abuse exists in the reported data and a credit value of each identification node, as a target judgment result; and
in response to determining that the number of identification nodes is less than the preset number of nodes, send the reported data to a consortium blockchain, and determine that a received second judgment result of the consortium blockchain on whether domain name abuse exists in the reported data is a target judgment result.

* * * * *